US006385840B1

(12) United States Patent
Scarfia

(10) Patent No.: US 6,385,840 B1
(45) **Date of Patent: *May 14, 2002**

(54) ASSEMBLY FOR APPLYING SIGNAGE AND METHOD FOR APPLYING SIGNAGE

(76) Inventor: Michael L. Scarfia, 42 Edside Dr., Rochester, NY (US) 14609

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/398,505

(22) Filed: Sep. 17, 1999

(51) Int. Cl.[7] .......... B23Q 3/00

(52) U.S. Cl. .......... 29/464; 29/467; 40/596; 40/618; 40/620

(58) Field of Search .......... 29/464, 428, 467; 40/595, 596, 620, 618

(56) References Cited

U.S. PATENT DOCUMENTS

| | | | | | |
|---|---|---|---|---|---|
| 190,695 | A | | 5/1877 | Temme | |
| 193,405 | A | * | 7/1877 | Hart | 40/584 |
| 261,477 | A | | 7/1882 | Neracher | |
| 1,587,966 | A | | 6/1926 | Le Fevre | |
| 1,822,265 | A | * | 9/1931 | Babcock | 40/618 |
| 2,076,907 | A | | 4/1937 | Meigs | |
| 2,096,406 | A | * | 10/1937 | Register | 40/596 |
| 2,211,937 | A | * | 8/1940 | Register | 40/618 |
| 2,260,068 | A | * | 10/1941 | Wagner | 40/618 |
| 2,267,887 | A | * | 12/1941 | Armstrong | 40/618 |
| 2,271,456 | A | * | 1/1942 | Hendricks | 40/618 |
| 2,383,024 | A | * | 8/1945 | Tarbbox | 40/618 |
| 2,457,883 | A | * | 1/1949 | Fuller | 40/618 |
| 2,586,009 | A | * | 2/1952 | Dickey | 40/618 |
| 2,591,779 | A | * | 4/1952 | Buck | 428/138 |
| 3,461,583 | A | * | 8/1969 | Buck | 40/595 |
| 3,477,159 | A | * | 11/1969 | Bank | 40/618 |
| 3,705,291 | A | * | 12/1972 | Thompson | 219/384 |
| 4,139,409 | A | * | 2/1979 | Macken et al. | 216/33 |
| 4,274,459 | A | * | 6/1981 | Galajda | 144/144.51 |
| 4,953,314 | A | * | 9/1990 | Moulton | 40/545 |
| 5,197,013 | A | * | 3/1993 | Dundorf | 364/474.24 |
| 5,223,316 | A | * | 6/1993 | Nemzin et al. | 428/45 |
| 5,347,737 | A | | 9/1994 | Theobald, III | |
| 5,356,697 | A | * | 10/1994 | Jonas | 428/195 |
| 5,504,144 | A | * | 4/1996 | Dorpfeld et al. | 524/588 |
| 5,703,782 | A | * | 12/1997 | Dundorf | 364/474.24 |
| 6,129,969 | A | * | 10/2000 | Pynenburg et al. | 428/67 |

* cited by examiner

*Primary Examiner*—P. W. Echols
*Assistant Examiner*—Essama Omgba
(74) *Attorney, Agent, or Firm*—Brian B. Shaw, Esq.; Stephen B. Salai; Harter, Secrest & Emery LLP

(57) ABSTRACT

A method of applying a sign comprising of raised characters to a surface using a template or pattern which provides a precise orientation and alignment of the characters. The method renders it unnecessary to separately align each character.

10 Claims, 3 Drawing Sheets

ASSEMBLY FOR APPLYING SIGNAGE AND METHOD FOR APPLYING SIGNAGE

FIELD OF THE INVENTION

This invention pertains to a method of applying multiple individual letters to a surface to form a signing function, and in particular to a method of aligning individual characters which make up signs.

BACKGROUND OF THE INVENTION

Many types of informational, advertising and directional signs exist in public and commercial buildings and areas. Broadly speaking, signs can have stationary characters or moving characters (or groups of characters.) Moving-character signs include a variety of types wherein the characters can are moved electro-mechanically, as with certain billboards, or electronically, as for example when video display monitors are used. Stationary signs can employ printed posters which are directly affixed to a surface or billboard, characters directly painted onto a surface, characters formed from fluorescent electrical tubes, characters applied onto a transparent or translucent surface which can be back lit by either natural or artificial light, and raised characters which can be individually applied to a surface. Other possibilities will readily come to mind among individuals who practice the art. The choice of signage is determined by many factors including visibility and economic, commercial, esthetic and artistic considerations.

In stationary signs, it is important to have the characters precisely aligned and spaced with respect to each other. Even slight misplacements can be very apparent to the eye and can present a displeasing or jarring appearance, thus making it visibly distracting and therefore decreases the intentioned effectiveness. Even when pre-formed individual characters are themselves dimensionally acceptable, to reduce misalignment, it is typically necessary to go through painstaking procedures involving repeated trial and error positioning. This "space variability" between characters given the number of letters, numerals and symbols that exist can be almost limitless.

In addition, it is often desired to differ from the normal spacing or placement of these characters, case in point, Toys "R" Us. Characters may not only be turned around backwards but also raised vertically, stretched horizontally so on and so forth, as far as the imagination can take the variables. When a client wants to go out beyond the normal pre-determined guidelines, this improper/proper alignment makes installing these characters or signage even more difficult. This compounds the difficulty of keeping the spacing of these characters in sync with each other and strengthens the need for specific guidance during an on-site installation.

Therefore, a need exists for a method of installation of characters, wherein the alignment of the characters to themselves as well as a support surface is accurately and efficiently achieved. The need also exists for a system which can locate and orient characters in a predetermined relationship.

SUMMARY OF THE INVENTION

This invention relates to the formation of signs from individual, raised characters which are affixed to any surface. In order to minimize the cost of labor necessary to affix signs of this type, it is desirable to have an exact positioning system which will greatly reduce the time to install such a sign while ensuring a satisfactory alignment of the characters. The designer of the fonts (set of specifically designed alphabet style) themselves cannot provide precise spacing patterns because of letter size differences along with available space provided for presentations, differs greatly and the letters themselves all will require variable spacing between letter combinations—again depending on their particular style, size and identity and thus compounding the space variability options in which letters are placed next to one another. The present invention provides for the location and installation of raised characters on a surface, such that the characters are correctly spaced and aligned without the expenditure of excessive time and labor. A raised characters may be formed by a computer-controlled laser-cutting process to shape a body piece from a chosen material of suitable thickness.

The body piece has fastening holes which allow it to be affixed to the surface with fasteners. A finishing layer is provided to match the shape of an underlying body piece, and can be made from another or the same material. A template is provided wherein each body piece nests within an outline of its shape. This nesting template is cut, also by a computer-controlled laser-cutting process, from a template material which correctly spaces and aligns the characters relative to each other. To ensure proper placing of characters on the surface, all that is now necessary is to properly attach the template to the surface, whereafter the characters are placed within their corresponding outline in the template and affixed to the surface. The template is then detached from the surface.

Another embodiment of the invention comprises the fabrication of a pattern which locates receiving holes in the surface to align with the fastening holes in the body pieces, the fastening holes being precisely positioned in the body pieces.

The invention thus provides for raised characters, and of a template or pattern, which are fabricated by a computer-guided tool, such that characters can be affixed with minimal effort to a desired position on a surface in pre-assigned spatial relationships with respect to each other.

DETAILED DESCRIPTION OF THE PREFERRED EMBODIMENT

For the purposes of this invention, the term "character" will be understood to refer to a tangible object in the form of a letter, a numeral or other symbol, in any chosen font or style as well as design, form or shape. The term "letter" will be understood to include upper or lower case letters, numerals and symbols when it is desired to refer to a shape rather than a tangible object.

Figure 2:
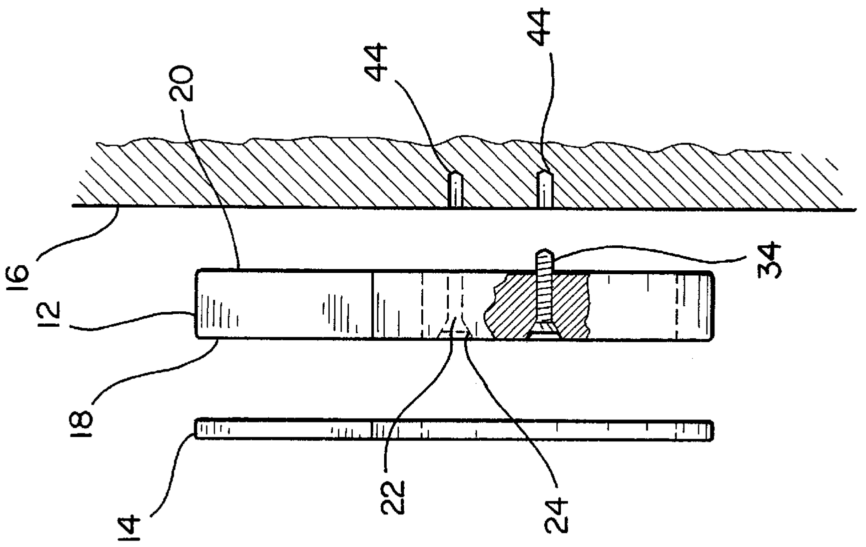
FIG. 2 is a side elevation of the components from FIG. 1, showing also a fastener and a surface.
Figure 1:
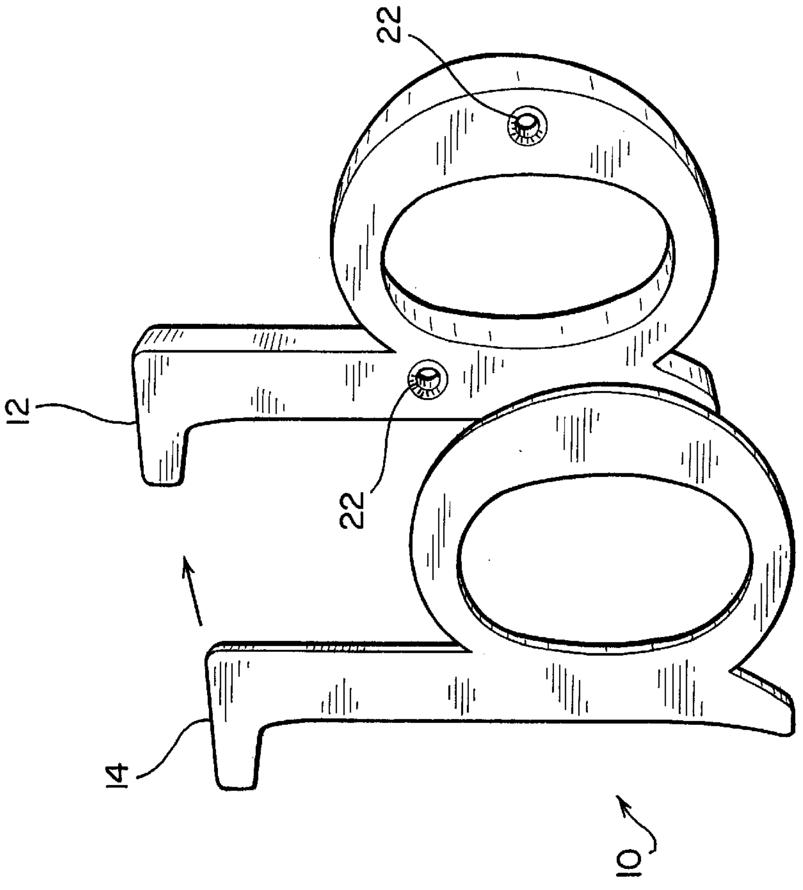
FIG. 1 is a perspective view of a body piece and a cap piece of a raised character.

As shown in FIGS. 1 and 2, a character 10, representing in this instance a lower-case letter "b", is formed from a body piece 12 and a cap piece 14 which fits precisely on the body piece. The character 10 is intended for use in a sign to be attached to a surface 16. The body piece 12 has a front surface 18, a rear surface 20, and two fastening holes 22 which are through holes. Depending upon how the body piece is to be attached to the surface 16, the fastening holes 22 may be internally threaded or they may be smooth and have a countersunk area 24 at the front surface 18. The body piece 12 and the cap piece 14 can be fabricated from dissimilar or like materials, as will be described later.

The body piece 12 and the cap piece 14 are each machined from a parent material with a computer-guided laser tool. Techniques of computer assisted machining and laser cutting are well known in the art and will not be described. It is sufficient to point out that the precise shape of a letter is programmed into the memory of a computer and that the cutter follows a prescribed path in shaping the body piece 12 and the cap piece 14 from their parent materials. The fastening holes 22 in body piece 12 are formed by computer-assisted drilling at points which are again programmed into the computer memory, and are consistently located in all body pieces 12 which represent any given character.

Typically, the material for the body piece is inexpensive, but the higher-quality material for the cap piece 14 can be quite expensive. By computer-assisted machining, the cap pieces 14 for a given set of characters are cut from a sheet of material in a pattern which achieves the least wastage of the material.

Having formed the characters necessary to produce a given sign, it is also necessary to prepare a template for correctly and precisely placing the characters 10 relative to each other. Proper placement requires not only that the characters 10 should be at consistent heights and angles, but that they should be appropriately separated from each other.

Figure 3:
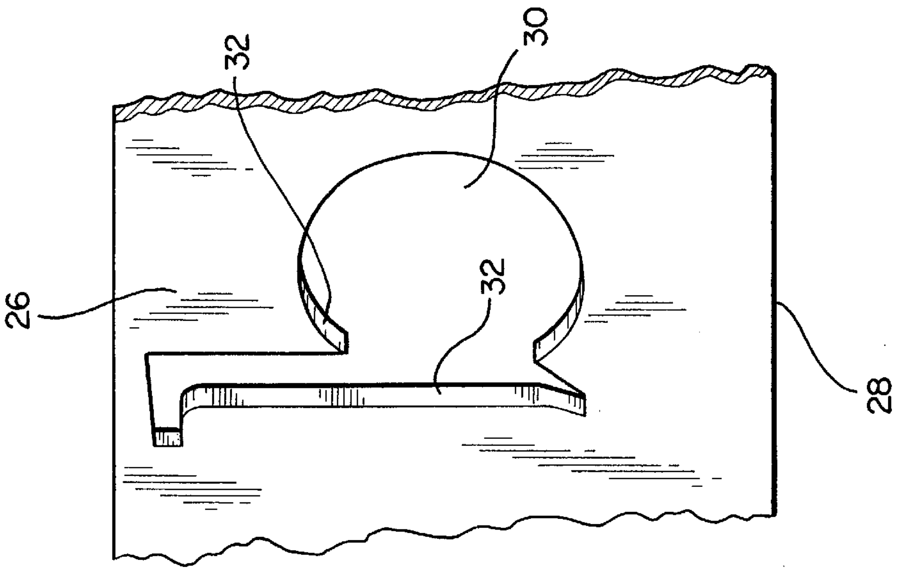
FIG. 3 is a perspective view of part of a template.
Figure 6:
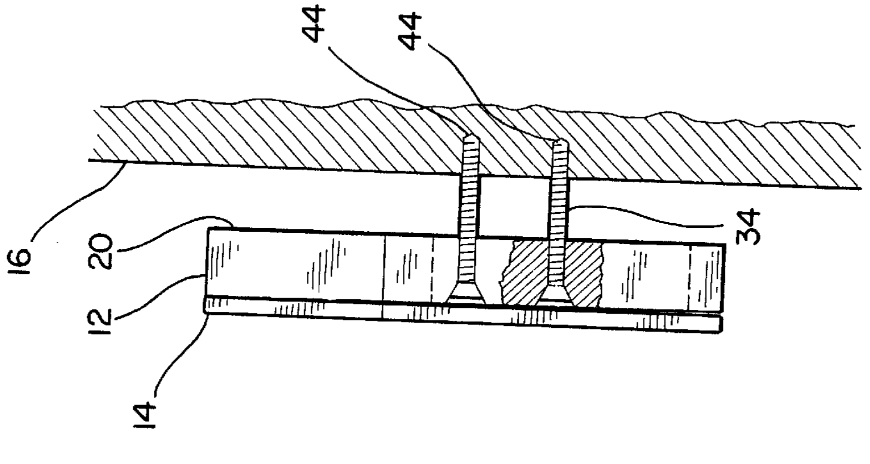
FIG. 6 is a side elevation view showing components of FIG. 1 assembled so as to stand off from a mounting surface.

A template 26 is formed from a sheet of template material, such as chipboard, by a computer-controlled laser-cutting technique similar to that used in shaping the body pieces 12 and the cap pieces 14. Preferably, the template has a sufficient thickness to receive and align the respective character. In addition, the template has sufficient integrity to maintain the relative spacing of the characters. The template may also be provided with a square reference edge 28. In this case, the computer is programmed so that the cutter removes the outline of a first character 10 from the template to produce an opening 30 such as that shown in FIG. 3 for the letter "b". This opening 30 is sized to receive the corresponding body piece 12 closely enough to determine a precise location but loosely enough to allow the template 26 and the body piece 12 to be separated when this is required. Once the outline of the first character 10 has been cut, the laser cutter proceeds to cut a second and succeeding characters 10 as programmed by the computer. This process provides a template 26 in which the characters of a sign are precisely and accurately outlined relative to each other and to the reference edge 28, and in which the body pieces can be appropriately nested for attachment to the surface. It is emphasized that the cut surface 32 around the perimeter of opening 30 is perpendicular at all points relative to the plane of the template 26. However, it is understood a bevel may be used to assist in inserting the character into the template.

The template 26 is now placed against the surface at a location chosen for the sign. The term surface includes any surface upon which the characters are to be retained. The surface may include a wall, a sign board, a display panel, a ceiling, or even a floor. For purposes of clarity the term surface is used in the description. Once the template 26 has been precisely positioned and leveled, it is now firmly but removably affixed to the surface by means such as screws or adhesive compounds. This part of the process affirms proper aesthetic positioning thus eliminating improper balancing with the sign's surroundings before permanent installation of the characters takes place. One of the body pieces 12 is nested into its position in template 26 and attached to the surface with fasteners 34. The process is repeated until all required body pieces 12 have been so attached. The template 26 is unfastened from the surface and pulled away therefrom, leaving behind the newly affixed body pieces 12 in the positions determined by the template 26.

A great advantage of the present invention is that the body pieces 12 can be affixed to the surface in any sequence and not necessarily in the order that their letters actually read, which greatly speeds the affixing process. Once the template 26 is in place, the presence or absence of any body piece 12 is irrelevant to the positioning of any other body piece 12. The laser-assisted machining of the body pieces 12 and the template 26 serves to avoid painstakingly having to align each body piece in turn. The only step of the method which requires special care is the placing and leveling of the template 26 on the surface, and it can be readily appreciated that this represents a drastic saving in time and labor over prior art.

Once the body pieces 12 are in position, the cap pieces 14 are affixed to the appropriate body pieces 12 to conceal fastening holes 22 and to provide a decorative finish. Typically, this is achieved by having an adhesive material on the appropriate surface of either the body pieces 12, the cap pieces 14, or both. It should be noted that when fastening holes 22 have countersunk areas 24 and the fasteners 34 are conventional metal or plastic screws, the countersunk areas 24 are oversized, to allow the heads of the screws to be recessed relative to the front surfaces 18 of body pieces 12. This is to guard against the possibility of the screws thermally expanding beyond front surfaces 18 and forcing the cap pieces 14 away from the body pieces 12.

Figure 4:
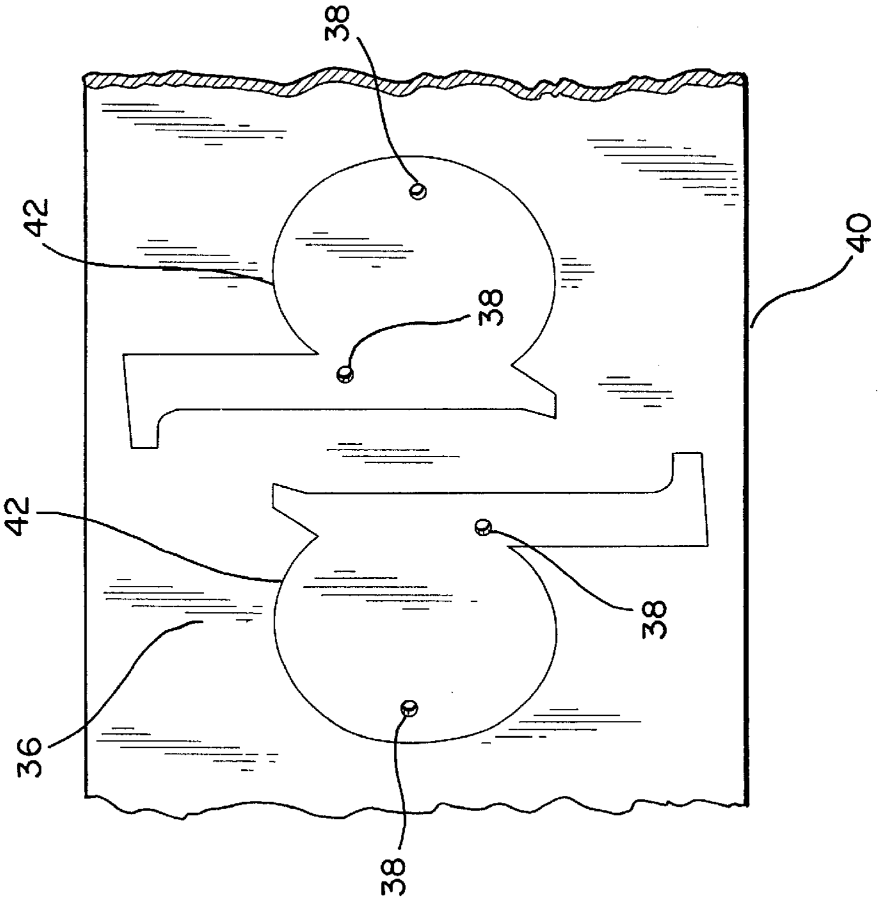
FIG. 4 is a perspective view of part of a pattern.

In a further, and preferred, embodiment of this invention, a pattern 36, shown in FIG. 4, is used in preference to the template 26. The pattern is made from an inexpensive material such as chipboard. However, other materials such as plastics and thermoplastics may be employed. It will be recalled that the character openings 30 in the template 26 were cut by a computer-guided laser tool. Such a tool is also used to make the pattern 36. In this case, however, the laser tool does not cut an opening in which an individual body piece nests. Instead, pattern holes 38 are made which precisely align with the fastening holes 22 of each body piece 12. Since the fastening holes 22 are identically located in all body pieces which represent the same letter, the corresponding pattern holes 38 serve to properly define the positions of the body pieces 12. The pattern holes 38 for successive body pieces 12 are placed so that they will properly locate the body pieces 12 relative to each other and a square reference edge 40 of the pattern 36. By employing the same data to fastening holes as the hole in the character, alignment is assured.

When the required pattern holes 38 have been made, the laser tool is used at a reduced power to lightly mark around given pattern holes the outline 42 of the corresponding letter. This is to visually indicate to an installer which character belongs at which location, since the pattern holes 38 by themselves do not provide any ready visual indication.

The pattern 36 with all the required pattern holes 38 is firmly but removably attached to the surface in a chosen alignment, and pattern holes 38 are used as a guide for drilling receiving holes 44 in the surface to receive fasteners 34. After removal of the pattern 36 from the surface, the body pieces 12 are attached to the surface or maybe offset as desired with spacers producing an offset appearance satisfying a client's particular choice. The cap pieces 14 are placed on the body pieces as in the previous embodiment. Once again, the precise positioning and alignment of characters 10 does not depend on their being affixed to the surface 16 in any particular sequence.

Figure 5:
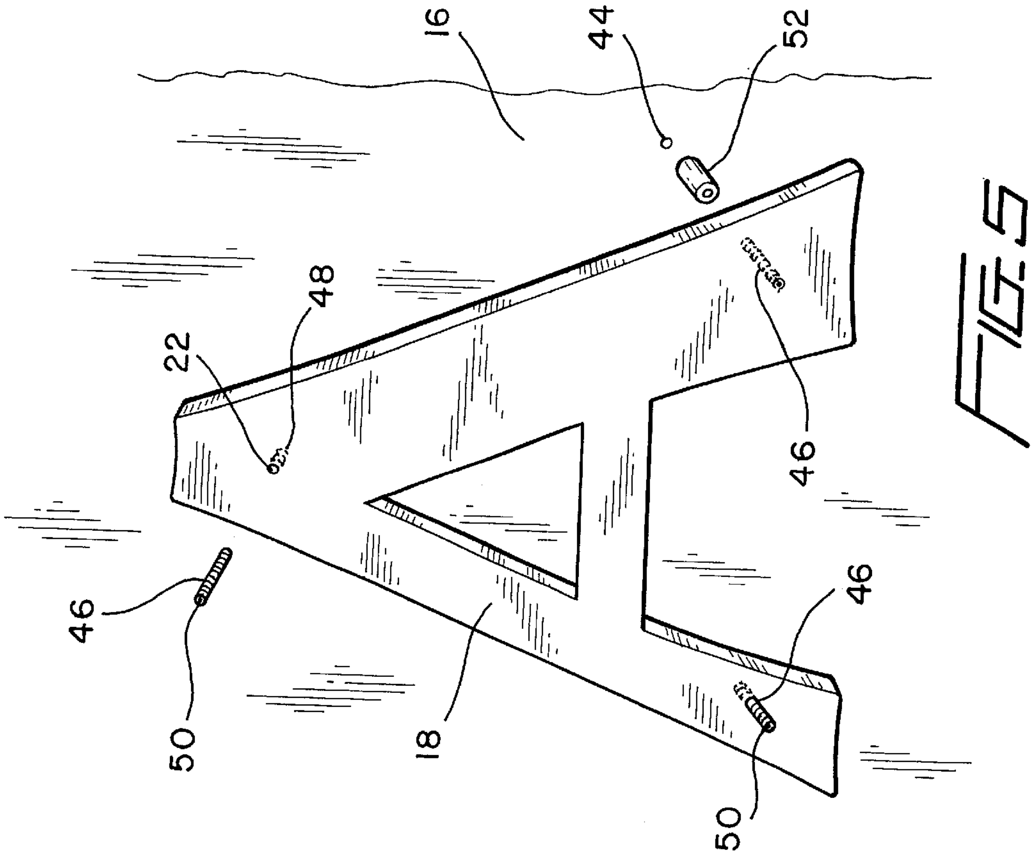
FIG. 5 is perspective view of a body piece and fasteners in another embodiment of the invention.

Returning now to the fasteners 34, they may take forms other than that of conventional screws. In the preferred embodiment of the invention, each fastener comprises a selected length of threaded nylon rod 46 which engages a corresponding internal thread 48 of the fastening hole 22 in the body piece 12. The thread is formed by a normal tapping method after the fastening hole 22 is made by the aforementioned computer-guided laser tool. FIG. 5 shows a body piece 12 corresponding to the upper-case letter "A", with three fastening holes 22, at each of which is shown a nylon rod 46 in different stages of insertion. The nylon rod 46 has at one end a hexagonal recess 50 to permit its engagement with an Allen wrench. The rod 46 is screwed from the front surface 18 into hole 22 until it no longer projects outside the plane of the front surface 18 of the body piece 12. At this point, the rod 46 extends outwardly from the rear surface 20.

With this fastening system, it is common to undersize the receiving holes 44 in surface 16 relative to the diameter of the threaded nylon rod 46. The rods 46 of a given body piece can be forced to a selected depth into the appropriate receiving holes 44 in the surface 16. The body piece 12 may contact the surface 16, or it may be spaced away from it by passing the rods 46 through a spacer 52 to produce a different visual effect. Optionally, when the body piece 12 is spaced away from the surface 16, the rods 46 may be used without the spacer 52 if they are unobtrusive enough. The flexibility and elasticity of the nylon rod material allows for secure placement in the surface while allowing for adjustment of the spacing from the surface if necessary. Furthermore, if an occasional receiving hole 44 cannot be drilled as far into the surface as normal, perhaps because of an obstruction such as a pipe, the rod 46 can be cut correspondingly short. Once all body pieces 12 are correctly placed, the cap pieces 14 are then appropriately attached to the body pieces to form the final characters 10. Yet other fastening means may be employed which are not a critical part of this invention.

It is obvious that spacers such as 52 can be employed in either embodiment of the invention. It is understood that the body piece, the cap piece, the template and the pattern can be made from a wide variety of materials and within a wide range of dimensions while remaining within the scope of the invention. The template and the pattern are made from materials selected based on their cost and their ability to hold their shape, with chipboard being among the most common. Typically, characters may fit within areas 6" high and 5½" wide, or 5" high and 4" wide, with typical thicknesses of body pieces including 3/16" and 3/8" or any sizes as needed on a specific job. The body piece 12 is usually cut from plastic stock and the cap piece 14 is cut from a sheet of plastic or metal about 1/16" thick. The cap piece 14 normally has a decorative finish. A plastic cap piece can have a metalized surface, or it can have a different color from the plastic of the body piece for visual effect. The plastic stock for the body piece and the sheet for the cap piece may each have a surface adhesive protected by a peel-off layer of paper. It is understood that the foregoing dimensions and materials as described herein are not limiting, other dimensions and materials may be selected as required.

Successive intermediate pieces may be interposed between the body piece and the cap piece when, for example, it is desired to achieve the effect of different layers with different colors. If intermediate pieces are used, they may be optionally be offset or differ in size from the first body piece to achieve distinctive visual effects. It is obvious that such an offset or difference in size can be accommodated by suitably programming the machine control computer. For example, fastening holes in the intermediate pieces can be located to allow the assembly of final characters to produce a desired visual effect.

With respect to each other, it is understood that the signage characters can be removeable as well as permanent.

A great advantage of the invented system is that it provides the simple replacement of individual parts should they be damaged or vandalized, without the necessity of realigning the any of the other characters.

While a preferred embodiment of the invention has been shown and described with particularity, it will be appreciated that various changes and modifications may suggest themselves to one having ordinary skill in the art upon being apprised of the present invention. It is intended to encompass all such changes and modifications as fall within the scope and spirit of the appended claims.

What is claimed is:

1. A method for applying signage to a mounting surface comprising:

a) forming a plurality of planar body pieces, representing desired characters, from a body material for attachment to the mounting surface, each body piece having planar front and rear surfaces and each body piece having a thickness sufficient to position the locating and orienting the body pieces in a predetermined relationship to each other and to the alignment edge;

b) locating the template against the mounting surface;

c) inserting the body pieces into the corresponding openings;

d) fastening the body pieces to the mounting surface;

e) removing the template; and thereafter f) attaching the cap pieces to the corresponding body pieces.

2. A method as in claim 1 comprising:

a) forming the template with a plurality of openings, each opening being for releasably engaging a corresponding body piece, the openings comprising the means for locating and orienting the body pieces in a predetermined relationship to each other and to the alignment edge;

b) locating the template against the mounting surface;

c) inserting the body pieces into the corresponding openings;

d) fastening the body pieces to the mounting surface;

e) removing the template; and thereafter f) attaching the cap pieces to the corresponding body pieces.

3. The method of claim 2, further comprising machining the materials with a laser.

4. The method of claim 3, further comprising controlling the laser with a computer.

5. The method of claim 1, further comprising cutting the body piece from a material having an adhesive layer on the front surface.

6. The method of claim 1, further comprising cutting a cap piece from a material having front and rear surfaces and an adhesive layer on the rear surface.

7. The method of claim 1, further comprising attaching the body piece to the mounting surface such that the body piece rear surface contacts the mounting surface.

8. The method of claim 1, further comprising attaching the body piece to the mounting surface such that the body piece rear surface is spaced from the mounting surface.

9. The method of claim 1, further comprising attaching an intermediate piece to the body piece, prior to attaching the cap piece, the intermediate piece being made of a material selected from a group consisting of the body material, the cap material and a different material.

10. A method as in claim 1 comprising:

a) forming the template with a plurality of pattern holes which correspond to the fastening holes, the pattern holes comprising the means for locating and orienting the body pieces in a predetermined relationship to each other and to the alignment edge;

b) locating the template against the mounting surface and forming receiving holes in the mounting surface corresponding to the fastening holes of the body pieces;

c) removing the template and then fastening the body pieces to the mounting surface with fasteners which extend through each body piece and into the receiving holes; and thereafter d) attaching the cap pieces to the corresponding body pieces.

* * * * *

UNITED STATES PATENT AND TRADEMARK OFFICE
CERTIFICATE OF CORRECTION

PATENT NO. : 6,385,840 B1
DATED : May 14, 2002
INVENTOR(S) : Michael L. Scarfia

It is certified that error appears in the above-identified patent and that said Letters Patent is hereby corrected as shown below:

Column 6,
Line 26, cancel beginning with "1. A method for applying" to and including "pieces." at Column 6, line 41 and insert the following claim:

1. A method for applying signage to a mounting surface comprising:

a) forming a plurality of planar body pieces, representing desired characters, from a body material for attachment to the mounting surface, each body piece having planar front and rear surfaces and each body piece having a thickness sufficient to position the front surface of a body piece spaced away from the mounting surface when the body piece is attached to the mounting surface;

b) forming fastening holes through each body piece, each hole having a counter sink portion at the front surface;

c) forming a planar cap piece from a cap material, each cap piece having a matching perimeter to a corresponding body piece and each cap piece being thinner than its corresponding body piece and the cap material being of a higher quality than the body material;

d) forming a template including an alignment edge and means for locating and orienting the body pieces in a predetermined relationship to each other and to the alignment edge to create a desired signage;

e) by means of the template, locating and orienting the body pieces in the predetermined relationship to each other and to the alignment edge with the rear surface of the body pieces facing the mounting surface;

f) first attaching the body pieces to the mounting surface with fasteners extending through the fastening holes and into the mounting surface, an end of the fasteners being disposed in the counter sink portion; and thereafter

UNITED STATES PATENT AND TRADEMARK OFFICE

CERTIFICATE OF CORRECTION

PATENT NO. : 6,385,840 B1
DATED : May 14, 2002
INVENTOR(S) : Michael L. Scarfia

It is certified that error appears in the above-identified patent and that said Letters Patent is hereby corrected as shown below:

g) adhesively attaching to the front surface of each body piece the cap piece having the matching perimeter so as to cover the entire body piece front surface and the ends of the fasteners and each cap standing off from the mounting surface by at least the thickness of its corresponding body piece.

Signed and Sealed this

Thirteenth Day of May, 2003

JAMES E. ROGAN
*Director of the United States Patent and Trademark Office*